May 2, 1961 A. BULOVA ET AL 2,982,020
ELECTRIC DRY SHAVER WITH GRILL TENSIONING MEANS
Filed April 3, 1956 3 Sheets-Sheet 1
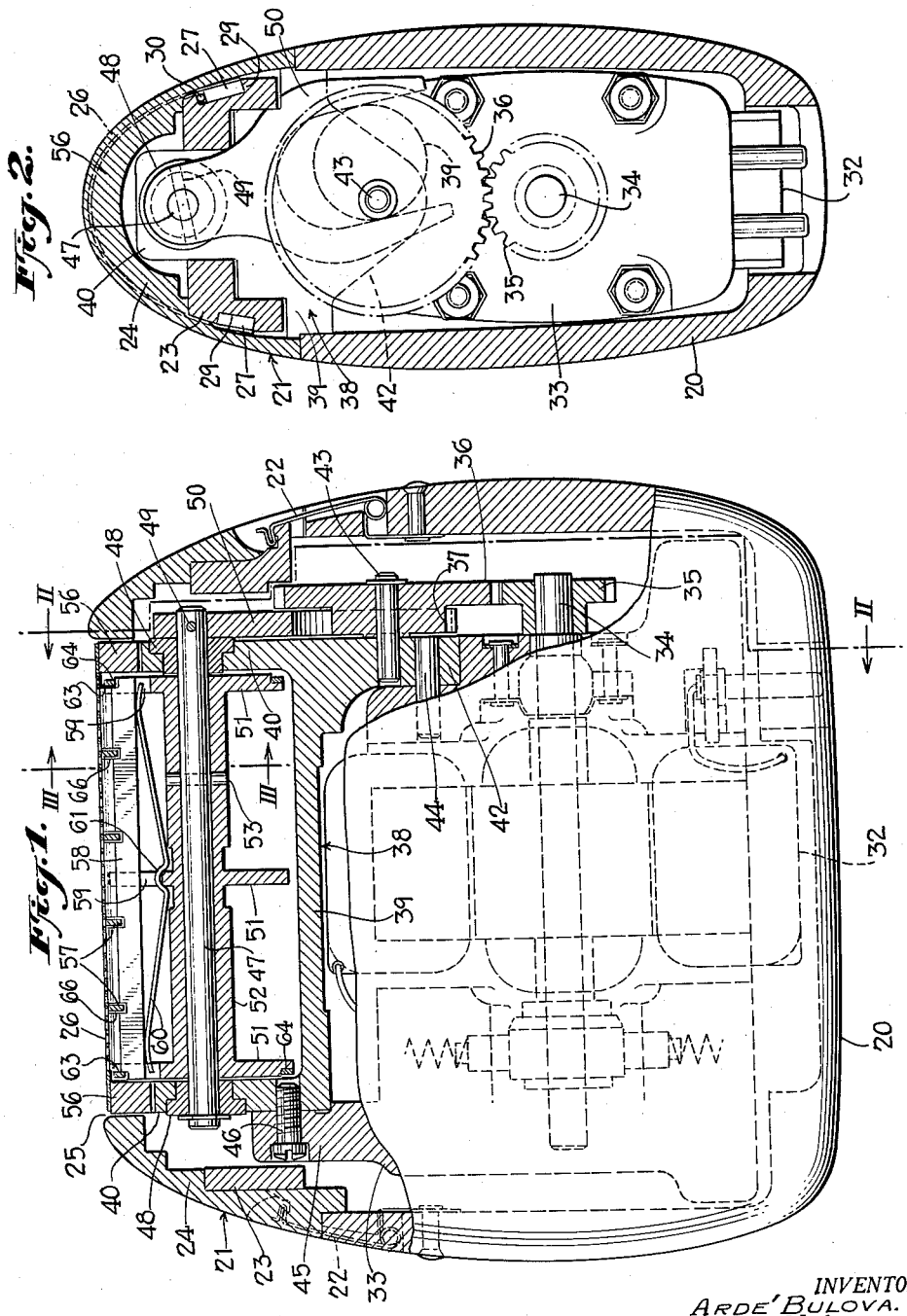
INVENTORS.
ARDE' BULOVA.
DAVID H. ANDERSON.
BY MORTON D. SCHLEIFER.
ATTORNEY.

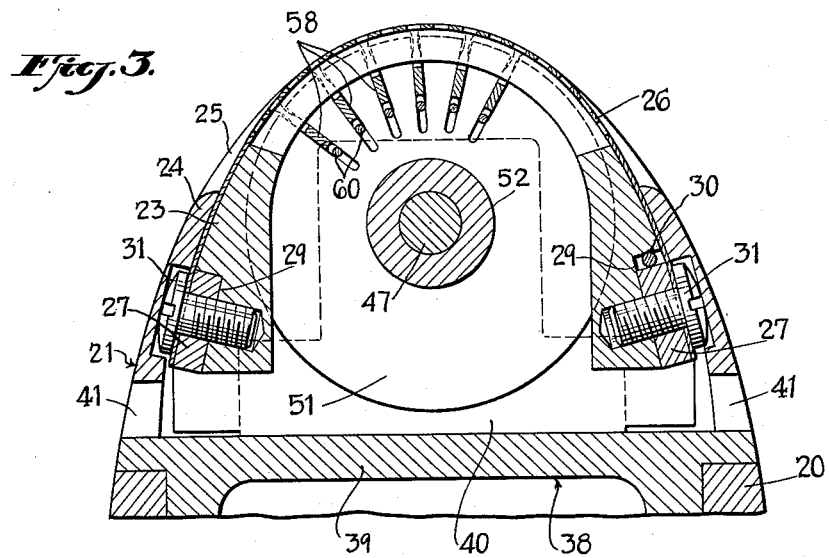
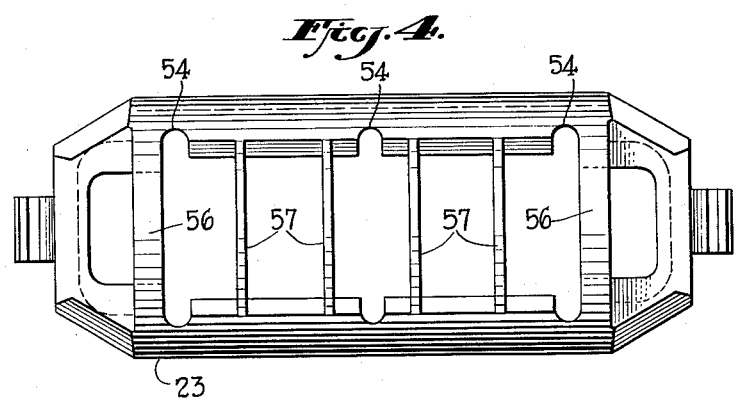
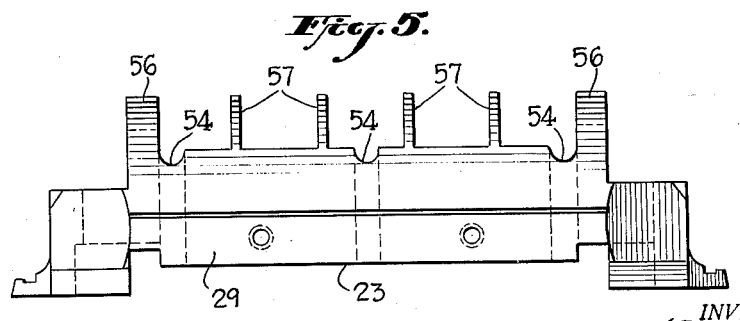
INVENTORS.
ARDE' BULOVA
DAVID H. ANDERSON.
BY MORTON D. SCHLEIFER.
ATTORNEY.

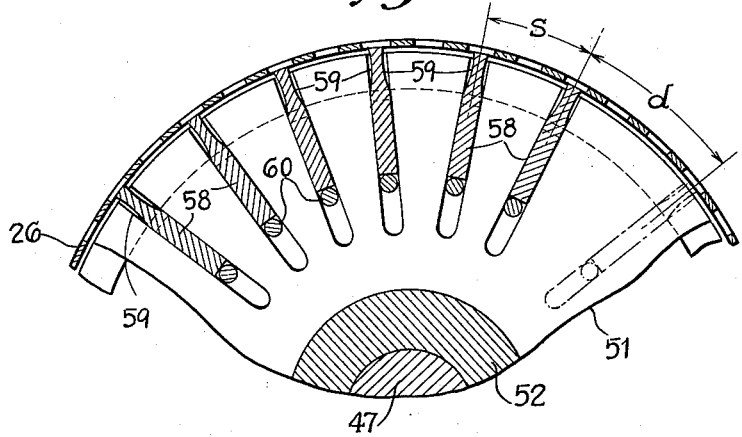
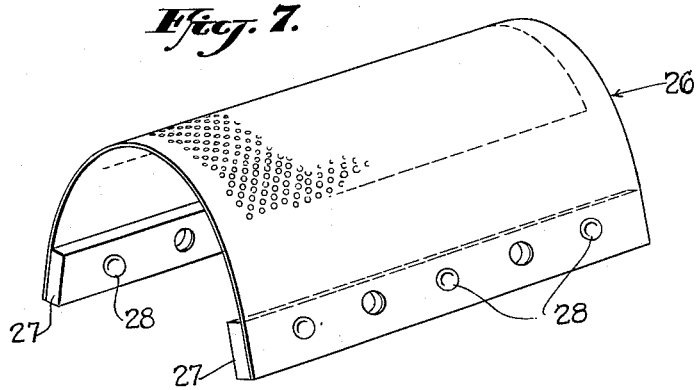
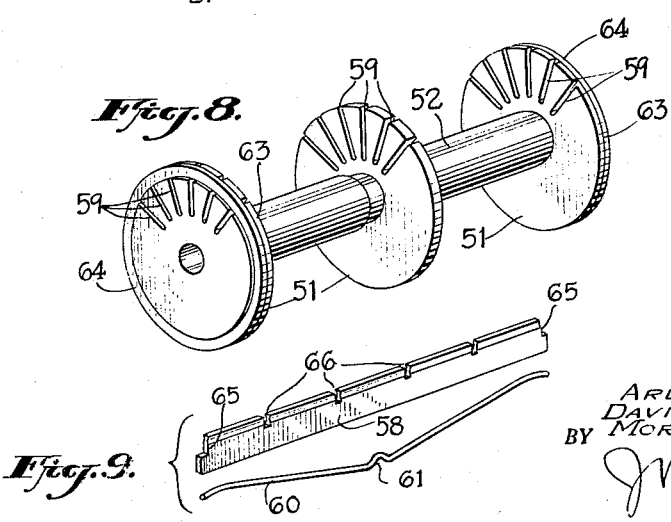

United States Patent Office 2,982,020
Patented May 2, 1961

2,982,020
ELECTRIC DRY SHAVER WITH GRILL TENSIONING MEANS

Ardé Bulova, New York, David H. Anderson, Flushing, and Morton D. Schleifer, West Hempstead, N.Y., assignors to Bulova Watch Company, Inc., Flushing, N.Y., a corporation of New York Filed Apr. 3, 1956, Ser. No. 575,784

4 Claims. (Cl. 30—43)

This invention relates to dry shavers of the type driven by a self-contained electric motor and popularly referred to as an electric shaver. It is common practice in the construction of electric shavers to employ a grill or comb with a perforate area that constitutes the portion of the shaver that is brought into contact with the user's face or other surface to be shaved and moved around on that surface during the shaving operation. The whiskers or other stubble enter the perforations, and at the moment they do so, before the user can move the grill, it is the intent to cut or shear the introduced hair. Prior art shavers of this type have been deficient in that the user, especially if in a hurry, imparts such rapid movement to the shaver from place to place that the stubble is partially or wholly withdrawn from within the grill before the cutter within the grill has opportunity to engage and cut the hair. The user ordinarily has to go over the same spot several times to get a clean or close shave to ultimately cut off the hairs that failed to remain in the comb or grill long enough for the cutter to perform its function thereon during previous passages of the shaver over that spot. The manufacturer of the shaver is handicapped in endeavor to make the shaver more efficient since increase of speed of transition of the cutter across the grill not only materially increases the noise level, but creates so much additional heat that is objectionable and results in shaving becoming exceedingly uncomfortable, in addition to which the rapid vibration developed by increased speed makes it difficult to hold the shaver firmly and in its proper contact position with the surface being shaved.

Fundamentally the present invention recognizes the problem outlined above and solves it with novel construction effecting a more perfect shave with normal rate of transition of the shaver over the surface being shaved and even with a more rapid transition than normally employed by users.

Contrary to prior efforts in the art to improve the shaving by increase of cutter speed, this invention avoids any increase in such speed.

It is within the purview of the present invention to provide for a less cutter speed than heretofore used or deemed requisite in dry shavers.

Likewise of general nature, the invention reduces both clatter and vibration from that which has prevailed in the prior art shavers.

Somewhat more specifically, the invention proposes a short sweep for a blade so as to have such close proximity to a whisker introduced through the grill that the cutting will occur promptly and before movement of the shaver can withdraw the whisker.

Even more specifically, the invention contemplates utilization of a plurality of blades each of which sweeps only a portion of the perforate grill area, the sweeps being complementary and to desired extent overlapping.

In greater detail, the invention provides a plurality of blades which remain intact with the shaving head when the grill is released from contact therewith for cleaning or other purposes, and yet providing for spring loading of the blades individually into contact with the grill, when in place, for assuring shearing action.

Another object of the invention is to provide a structure enabling use of individually movable blades in substantial parallelism with a shaft coaxial with the arc of oscillation of the blades and with that shaft parallel to the motor armature shaft.

A further object of the invention is to simplify the drive from the constantly rotating armature shaft to the oscillation shaft and obtain the desired oscillation with adequate power applied thereto to assure steady operation under varying load conditions.

Important amongst the objects of the invention is to provide grill support at short intervals and discourage denting and misalignment of said grill.

Other objects, advantages and beneficial constructional features will appear to persons skilled in the art to which the invention appertains as the description proceeds, both by direct recitation thereof and by implication from the context.

Referring to the accompanying drawings, in which like numerals of reference indicate similar parts throughout the several views:

Figure 1 is a view partially in front elevation and partially in section on a plane through the middle of the shaver;

Figure 2 is a vertical section on line II—II of Fig. 1;

Figure 3 is another vertical sectional view taken on line III—III of Fig. 1, with the scale increased and for the most part showing only the shaving head;

Figure 4 is a plan of the cap frame;

Figure 5 is a front elevation of said cap frame;

Figure 6 is a cross section, on further increased scale, of a portion of the grill, blade mounting means, blades and springs therefor;

Figure 7 is a perspective view of the grill shown attached to retaining bars;

Figure 8 is a perspective view of the blade mounting means; and

Figure 9 is an exploded view of a blade and its spring.

In the specific embodiment of the invention illustrated in said drawings, the dry shaver comprises a body casing 20 of appropriate size and shape for a user to conveniently hold in one hand while operating. At what will arbitrarily be termed the top or nose end of said casing is a cap 21 fitting thereon and held in place by resilient latches 22. Said cap includes an inner metal frame 23 and an outer shell 24 of plastic or other desired material, said shell being held by frictional fit or otherwise on said frame.

For convenience of description and for orienting purposes, it may be pointed out that in the arbitrary position shown in the drawings, the front and back of the exterior of the shaver are alike, and might therefore either be at the front or at the back, so for brevity herein, they will be referred to as the fronts. The rounded side edges of the shaver integrally joining said fronts, although not having a definite line of demarcation from said fronts, will be referred to as the side edges of the shaver, and corresponding terminology will be employed indicative of direction as they may apply in the particular positions in which found in the drawings.

The upper or forward nose end of said cap provides an elongated opening 25 extending from proximity of one side edge to the other side edge of the cap, exposing for the entire opening area a grill or comb 26 which is, for most of its exposed portion substantially a segment of a cylinder in shape and has the usual perforate shearing area that constitutes the portion of the shaver which is brought into contact with the hairy surface where shaving is to be performed in use, hereinafter referred to, for brevity, as the face of the user. At the side edges of opening 25 of the cap there is no underlapping of the side edges of the grill, those edges of the grill being very close to but not interfered with by the side edges of the opening. However, at the fronts of said cap, the front margins of the grill are interposed between the cap frame 23 and cap shell 24 as shown in Fig. 3. Each of said front margins of the grill has a bar 27 lengthwise thereof and secured thereto as by rivets 28 (see Fig. 7). The bars are received in channels 29 at the fronts of the frame 23, one channel being high enough to also receive longitudinally therein a wire or other wedge 30 so that the grill will be pulled tightly when the bar is pressed into place in the channel with said wedge along the top edge of said bar. Screws 31 through said margins and bars into said frame 23 secure the bars to the frame, thereby retaining the grill in place.

Within body casing 20 is an electric motor, designated in general by numeral 32, said motor having a housing 33 and an armature shaft 34 protruding at one side thereof. On said protruding end of said shaft, fixed thereto, is a driving gear 35 shown in mesh with a driven gear 36 at the inside face of which is an eccentric 37 integrally formed with said driven gear or otherwise made to rotate therewith.

On the top of said motor, for rigid support thereby, is a shaving head 38 constituted as an assembly attachable to said motor and having a horizontally disposed base plate 39 which forms a top closure for the motor housing and will keep hair trimmings from getting into said motor. At each end of said base plate there is an upstanding bracket 40 shown integral with the base and parallel to each other. There are clean-out openings 41 immediately above base plate 39, said openings extending lengthwise substantially from bracket to bracket.

At one side end of the base plate 39, depending therefrom, is a leg 42 which is arranged to fit against a side portion of the motor housing 33 at that side thereof where said gears are located. Said leg depends between the motor housing 33 and aforementioned eccentric 37, and has a trunnion 43 fixed therein on which said eccentric 37 and gear 36 are rotatably mounted. Below said trunnion, and parallel thereto, is a dowel 44 which projects into the motor housing. In applying the shaving head assembly 38 to the motor housing 33, said assembly is slid in a direction parallel to base plate 39 and to dowel 44, so that the dowel is introduced into the hole prepared for it in the motor housing. At the other side of the motor housing there is a boss 45 projecting upwardly therefrom above the level of ultimate location of base plate 39 so that as the shaving head assembly 38 is slid home, the boss will stand in the path of movement thereof and will be engaged by the basal end margin of bracket 40 at that end of the shaving head. A screw 46 is then introduced through said boss 45 and threaded into the contiguous bracket, and therefore, in coöperation with the dowel 44 at the other end of the shaving head, said shaving head assembly is retained in its desired fixed position.

Extending longitudinally of the shaving head 38 through the brackets 40 at the ends thereof, is a cutter or blade shaft 47 suitably mounted in bushings 48 provided for the purpose in said brackets. This shaft 47 is intended to have a partial rotation back and forth which will be referred to herein as oscillation of said shaft. At one protruding end of the shaft 47, fixed thereon as by a pin 49, is a depending forked arm 50 the tines whereof straddle eccentric 37, by virtue of which rotation of said eccentric will swing the arm 50 back and forth and will oscillate said shaft 47.

Fixed with respect to said shaft 47 to oscillate therewith, are a plurality of blade-carriers or rockers 51 which have radial projection from the shaft. One convenient mode of providing and mounting blade-carriers, is to pass the shaft through a sleeve 52, said sleeve extending from bushing to bushing carrying the shaft, said sleeve being secured to the shaft by a transverse pin 53 through both.

The sleeve is equipped, for example, with radially projecting flanges constituting said blade-carriers 51 and here shown as discs integral with said sleeve. Furthermore, as here shown, there is a flange or blade-carrier 51 at each end of the sleeve 52 contiguous and parallel to brackets 40, and another flange 51 midway between and parallel to the two end flanges 51.

It is now appropriate to point out that the edges of blade-carriers or flanges 51, for at least that portion thereof toward the grill, have a curvature coaxial with the shaft 47 and that the corresponding portion of the grill is likewise coaxial with said shaft, thereby enabling said flanges to be located close to the grill and to be rotatively oscillated, which of course occurs when the shaft 47 on which the blade-carriers or flanges are carried is rotatively oscillated. While the flange or blade-carrier peripheries are close to the grill, they preferably do not engage it.

As may be best seen in Fig. 4, the frame 23 has appropriate vertically directed furrows 54 at proper spacing and of appropriate depth agreeable to the location and diameter of the several flanges 51 in order to admit said flanges into the frame and permit oscillation of said flanges without interference by said frame. Near the ends of the frame and integral therewith in proper location to underlie the end margins of the grill, are provided arched end ribs 56 and at spaced intervals along the frame between said end ribs are intermediate arched ribs 57 also integral at their ends with said frame. All of these ribs 56 and 57 span from front to back of the frame with an outside curvature substantially semi-cylindrical on a radius corresponding to the radius of curvature of the inside of the grill and coaxial therewith and with said shaft 47. These ribs 56, 57 consequently will constitute supports in engagement with the inside surface of the grill in a peripheral direction thereof. There being adequate space at the end margins of the grill, end ribs 56 are shown as having a thickness commensurate with the thickness of the bracket 40 and rise from the frame adjacent to said brackets at the fronts thereof and extend over the brackets. The intermediate ribs 57 are made relatively thin so as not to obstruct the perforate or shearing area of the grill more than necessary.

Aforementioned blade-carriers or flanges 51 projecting from sleeve 52 on shaft 47 are for purpose of providing rockers in which to mount elongated blades 58 approximately coextensive with shaft 47 and in planes including the axis of said shaft and consequently herein referred to as radial to the shaft. Outer longitudinal edges of the blades are in shearing engagement with the grill lengthwise of the perforate or shearing portion thereof, and as the shaft oscillates it will correspondingly oscillate the blades each with a sweep against a partial area of said perforate portion of said grill. There are a plurality of said blades, six being shown in the drawings, with equal angular spacing one from another, and the sweep $d$ traversed by each blade is preferably greater than the distance $s$ between any two blades, so that the sweep of each blade thereby overlaps the sweeps of the next adjacent blades, with the result that the aggregate sweep of all of the blades traverses the entire perforate or shearing portion of the grill, but each blade only has to travel a fractional part of the aggregate sweep. It will therefore now be appreciated that the angular displacement or oscillation of any individual one of the blades is only a small part of the angle subtended by the perforate or shearing area of the grill. Having such a small distance of travel, each blade will be so close at hand to whiskers entering the perforations in its range of sweep that the whiskers will be sheared promptly before they can possibly be withdrawn by transition of the shaver to adjoining parts of the user's face. It also may be pointed out in this connection, that the short sweep of each blade reduces the noise level, and this may be even further reduced by operating at a somewhat slower speed than would be necessary were only one blade being oscillated over the entire perforate area of the grill. It is also noteworthy that small angular displacement for each cycle materially lessens vibration from that which would occur with the larger angular displacement were only a single blade used for the entire sweep.

In order to mount the blades 58, the rockers or blade-carriers 51 are each correspondingly provided with deep grooves 59 from their peripheries radially inward and just wide enough to slidably receive the blade. Underneath each blade is a wire or leaf spring 60 appropriately bowed and here shown as having its middle provided with a half-loop 61 and bowing outwardly at its ends to apply spring tension against the under edge of each blade proximate to the ends of the blade. As each spring traverses a plurality of grooves 59 and lies under its blade 58, it is held captive in operative position and exerts its pressure constantly on the blade.

The blades are retained in place in the rockers or blade-carriers 51 when the user removes cap 21, which of course means that the grill 26 is removed from in front of the blades. As here illustrated, retention is obtained by forming an annular recess 63 at the outer peripheral corner of the two end rockers or flanges 51 and filling the recess, after the blades are applied, with a ring 64. The end rockers or flanges thus have a reduced peripheral thickness but that reduced thickness still provides the radial blade-receiving grooves 59. The ends of the blades are notched at 65 to project under rings 64, said notches affording adequate movement for the blades toward the grill so as not to interfere with the blade being spring-actuated into tight shearing engagement with the grill in use of the shaver. The end shoulders resulting from presence of notches 65 will engage against the inside face of ring 64 to hold the blade from longitudinal displacement.

At predetermined locations on the shearing edge of each blade are slots 66 to permit the blade to straddle the intermediate ribs 57 of the frame. The shearing edges of the blades consequently engage the grill from rib to rib and since the blades are strongly spring loaded they will give material support to the grill, and in view of the use of a plurality of blades, that support will be continuously under the perforate area of the grill where pressed against the user's face. The ribs and blades therefore cooperate to support the grill and to prevent it from being bent inwardly or dented under ordinary use conditions, which enables the grill to be made of very thin material, such as stainless steel and for instance of about two or three thousandths of an inch in thickness. A thin grill is desired in order to obtain the closest possible shave from shearing action of the blades on the shearing surface of the grill.

In conclusion, it is emphasized that the invention utilizes a plurality of cutting blades approximately coextensive with the shaft carrying the same and parallel thereto, the blades being in radial planes intersecting at the shaft axis. The blades have angular spacing one from another to evenly dispose the shearing edges short distances apart in contact with the shearing surface of the grill. The rotary motion of the motor is translated into oscillatory motion of blade shaft and blades with an angularity of motion of the shearing edges of the blades somewhat in excess of the distances separating shearing edges of successive blades so that the sweep of each blade will overlap the sweep of the next adjacent blade. The blades not only function with the grill to shear whiskers or the like entering the perforations of the grill, but also function, by continuous presence under the perforated area of the grill, to support the grill at closely spaced intervals in conjunction with the support provided by semi-circular ribs. The individual spring-loading of the blades assures tight shearing contact of the shearing edges of the blades with the shearing surface of the grill as well as providing the aforementioned support for the grill which therefore can be very thin with minimum danger of being depressed or dented in use. The use of a plurality of blades reduces the stroke or oscillation required of each and minimizes noise and vibration. Parallelism of the blades and shaft by which carried, and parallelism of that shaft with the armature shaft not only lends itself to simplicity of construction, but also conserves space and driving mechanism from motor to blades. It may also be pointed out that the structure obtaining retention of the blades by the shaving head upon removal of the cap and grill has the important advantage of preventing the blades from popping out, with possible loss thereof, or from having to be reinserted by the user, which might not be done properly. It may also be noted that although the rings 64 overlie notched ends of the blades, the notches are only a part of the thickness of the flanges or rockers so that a part of the full height of the end of the blade also lies within the groove 59 to the outer periphery of the flanges or rockers and avoids any possible twist occurring in the blade. The structure is sturdy and compact and as oscillation may be at slow speed, and with the motor rotating at slow speed, minimum heat is developed.

What is claimed is:

1. An electric shaver comprising a casing, a flexible grill member disposed at one end of said casing and having a supporting frame for shaping a shearing portion of said grill to substantially cylindrical form, said grill having bars at longitudinal edges thereof and each bar having a longitudinal face substantially perpendicular to the portion of the grill proximate thereto, said faces of the bars underlying a part of said frame, and means between said face of one of said bars and the frame for applying tightening tension to said grill.

2. An electric shaver comprising a casing, a flexible grill member disposed at one end of said casing and having a supporting frame for shaping a shearing portion of said grill to substantially cylindrical form, said grill having bars at longitudinal edges thereof and each bar having a longitudinal face substantially perpendicular to the portion of the grill proximate thereto, said faces of the bars underlying a part of said frame, and longitudinal wedge means between said face of one of said bars and the frame for applying tightening tension to said grill.

3. An electric shaver comprising a casing, a flexible grill member disposed at one end of said casing and having a supporting frame for shaping a shearing portion of said grill to substantially cylindrical form, said grill having longitudinal bars fixed thereon at the inner face of the grill, said bars underlying a part of said frame and the grill with its said bars being removable from said frame, and a cylindrical wire constituting a wedge located between one of said bars and the frame for applying tightening tension to said grill.

4. An electric shaver comprising a casing, a flexible grill member disposed at one end of said casing having a frame for shaping said grill to provide a shearing portion of substantially cylindrical form, a shaft disposed in parallel relation to said shearing portion, flanges proximate to each end of and on said shaft, said flanges having corresponding grooves therein extending to the peripheries of the respective flanges, a plurality of elongated blades having end portions disposed in corresponding grooves of the flanges, rings on said flanges overlying said end portions of the blades retaining said blades from escape at the peripheries of the flanges and retaining said end portions of said blades in said grooves, springs in said grooves for urging said blades into contact with said shearing portion of the grill, and means for actuating said shaft and blades.

References Cited in the file of this patent

UNITED STATES PATENTS

| 2,234,891 | Bruecker | Mar. 11, 1941 |
| 2,234,929 | Lynch | Mar. 11, 1941 |

(Other references on following page)

UNITED STATES PATENTS

| | | |
|---|---|---|
| 2,321,932 | Nyhagen | June 15, 1943 |
| 2,323,745 | Wildeboor | July 6, 1943 |
| 2,331,500 | Rand | Oct. 12, 1943 |
| 2,334,995 | Dalkowitz | Nov. 23, 1943 |
| 2,370,544 | Jepson | Feb. 27, 1945 |
| 2,461,858 | Towers | Feb. 15, 1949 |
| 2,561,241 | Streng | July 17, 1951 |
| 2,598,292 | O'Russa | May 27, 1952 |
| 2,702,939 | Gardner | Mar. 1, 1955 |
| 2,726,445 | Winther | Dec. 13, 1955 |

FOREIGN PATENTS

| | | |
|---|---|---|
| 1,086,316 | France | Aug. 11, 1954 |